(12) United States Patent
Qu

(10) Patent No.: US 9,595,060 B2
(45) Date of Patent: *Mar. 14, 2017

(54) SYSTEM AND METHOD FOR DATA TAGGING APPLICATIONS

(71) Applicant: Lidong Qu, Beijing (CN)

(72) Inventor: Lidong Qu, Beijing (CN)

(73) Assignee: Lidong Qu, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/374,997

(22) PCT Filed: Jul. 18, 2014

(86) PCT No.: PCT/CN2014/082553
§ 371 (c)(1),
(2) Date: Jul. 28, 2014

(87) PCT Pub. No.: WO2015/039491
PCT Pub. Date: Mar. 26, 2015

(65) Prior Publication Data
US 2016/0203541 A1    Jul. 14, 2016

(30) Foreign Application Priority Data

Sep. 18, 2013  (CN) .......................... 2013 1 0430210

(51) Int. Cl.
*H04N 7/16*     (2011.01)
*G06Q 30/06*    (2012.01)
(Continued)

(52) U.S. Cl.
CPC ... *G06Q 30/0635* (2013.01); *G06F 17/30879* (2013.01); *G06Q 20/322* (2013.01);
(Continued)

(58) Field of Classification Search
CPC . H04N 21/4532; H04N 21/4542; H04N 7/163
(Continued)

(56) References Cited

U.S. PATENT DOCUMENTS 6,537,324 B1 * 3/2003 Tabata ................ G06F 17/2229
715/205
7,850,067 B1 * 12/2010 Persson ............ G06K 19/06009
235/375
(Continued)

*Primary Examiner* — Annan Shang
(74) *Attorney, Agent, or Firm* — SV Patent Service

(57) ABSTRACT

The present invention relates to a method and system for data tagging in the field of computer technologies. In this method, a user terminal acquires tag data, obtains information about services and functions associated with the tag data, then interacts with target servers to exchange service and function information, and fulfills appropriate services and functions to complete the business application. The disclosed data tagging method and system allow user terminal to interact with directly target servers that are associated with relevant services and functions, which allows functions to be realized in distributed target servers, which simplifies the implementations of tag data, reducing the cost to setting servers. The disclosed data tagging methods allow more extensive applications of data tagging, improved user experiences, simplified processes, and lower costs.

23 Claims, 2 Drawing Sheets

(51) Int. Cl.
  *G06F 17/30* (2006.01)
  *G06Q 20/32* (2012.01)
  *H04L 29/08* (2006.01)
  *H04L 29/06* (2006.01)
  *H04N 21/2543* (2011.01)

(52) U.S. Cl.
  CPC ......... *G06Q 20/3276* (2013.01); *G06Q 30/06* (2013.01); *H04L 67/16* (2013.01); *H04L 67/42* (2013.01); *H04N 21/2543* (2013.01)

(58) Field of Classification Search
  USPC ... 725/25–28, 37–61, 4, 5, 87, 93, 104, 116; 709/217–232
  See application file for complete search history.

(56) References Cited

U.S. PATENT DOCUMENTS

| | | | | |
|---|---|---|---|---|
| 7,992,180 | B2* | 8/2011 | Hayakawa | H04N 1/00291 725/106 |
| 8,276,177 | B2* | 9/2012 | Kim | H04L 1/006 725/116 |
| 8,928,653 | B2* | 1/2015 | Mizutani | H04N 13/0029 345/419 |
| 2002/0154892 | A1* | 10/2002 | Hoshen | H04N 7/163 386/213 |
| 2003/0120555 | A1* | 6/2003 | Kitagawa | G01C 21/3623 705/26.1 |
| 2005/0011958 | A1* | 1/2005 | Fukasawa | G06F 17/30879 235/462.46 |
| 2008/0218792 | A1* | 9/2008 | Murata | H04N 1/2307 358/1.15 |
| 2008/0244002 | A1* | 10/2008 | Yano | H04N 21/21 709/203 |
| 2009/0125940 | A1* | 5/2009 | Kim | H04L 1/006 725/39 |
| 2010/0220936 | A1* | 9/2010 | Yamaguchi | H04N 19/146 382/238 |
| 2011/0191161 | A1* | 8/2011 | Dai | G06Q 20/204 705/14.38 |
| 2011/0307765 | A1* | 12/2011 | Kim | H04L 1/0047 714/776 |
| 2012/0008161 | A1* | 1/2012 | Rouhana | H04W 4/00 358/1.15 |
| 2012/0132701 | A1* | 5/2012 | Nakagawa | G06F 17/30879 235/375 |
| 2013/0050754 | A1* | 2/2013 | Wada | H04N 1/00145 358/1.15 |
| 2013/0223279 | A1* | 8/2013 | Tinnakornsrisuphap | H04L 41/0809 370/254 |
| 2014/0040437 | A1* | 2/2014 | Mitsuya | H04N 21/4349 709/219 |
| 2014/0214967 | A1* | 7/2014 | Baba | H04N 7/173 709/205 |
| 2015/0127439 | A1* | 5/2015 | Campos De Figueiredo Faceira | G06Q 30/0222 705/14.16 |

* cited by examiner

US 9,595,060 B2

SYSTEM AND METHOD FOR DATA TAGGING APPLICATIONS

BACKGROUND OF THE INVENTION

The present application relates to the field of computer application technologies, especially the field of data coding and data tagging.

Two-dimensional (2D) codes (also referred as two-dimensional barcodes, data matrix codes or QR codes) have large information capacity, high security, high rate of data retrieval, and error correction ability. After they were invented, 2D codes have been widely applied to logistics and operations management, and identification card management.

With increased popularity of smart phones, 2D codes can be captured and uploaded onto real-time Internet by smart phones in real time and used cross-media channels, which enable them to find wide applications in Object-to-Object (OTO) fields, such as information acquisition, mobile shopping, commodity counterfeiting, identity authentication, coupon distribution, and so on.

The mobile OTO applications of 2D codes currently focus on providing convenience in e-commerce; it still lacks in-depth applications.

On challenge to conventional 2D codes is that the servers that issue the 2D codes are responsible for the whole application process after the 2D codes are issued. For complex business applications, issuing 2D codes with comprehensive functions and integration of various stages of 2D code application require a lot of human and financial investments, which poses a barrier to 2D codes' application in large and complete business models. There is therefore a need to simplify the processes, in order for 2D codes to be effectively used in a wider range of and especially large-scale business applications. Moreover, there is also a need for better user experiences in 2D code applications.

SUMMARY OF THE INVENTION

The present application discloses systems and methods intended to overcome the above mentioned disadvantages in the conventional systems. The disclosed data tagging methods and systems are simplified and easier to use comparing to conventional technologies, which are suitable for large scale applications. The disclosed data tagging methods and systems also provide better user experiences and low-cost data tagging methods and systems.

To achieve the above objectives, the disclosed data tagging methods can include one or more of the following steps:

(1) A user terminal acquires tag data, and parses the tag data to obtain a set of information about the services and functions related to a business application. The service information and function information correspond to respective target servers;

(2) The user terminal and the target servers exchange information about the services and functions in order to accomplish the services and functions, and fulfill the business application.

Step (1) in the disclosed method can include the following steps:

(11) The user terminal acquires tagging data from a data tag issuing server, parses the tag data, and obtains corresponding information about the business application in the tag data;

(12) Based on the information about the business application, the user terminal obtains the set of service and function information and information about target servers related to the services and the functions.

The service and function information can include service Software Development Kits (SDK) and function SDKs respectively corresponding to the services or functions. The service SDK and the function SDK respectively include information about their respective target servers, comprising application programming interface (API), parameters, and protocol associated with the target servers.

Step (2) in the disclosed method can include one or more of the following steps:

(21) based user operations, the user terminal selects some or all in the set of service and function information;

(22) the user terminal interacts with each target server to exchange the selected service and function information, to accomplish appropriate services and functions, and to complete the business application.

In the disclosed method, the step of user terminal interacting with each target server to exchange the selected service and function information includes the following steps:

The user terminal determines whether the selected service and function information will be exchanged with the target servers in sequential or in parallel order;

The user terminal exchanges the selected service and function information with the target servers in sequence or in sequential or in parallel order.

The present disclosure also provides a data tagging system comprising a user terminal, which can include a tag data acquisition module, a tag data analysis module, and an interaction control module. The tag data acquisition module is configured to acquire data from data tags and store the data. The tag data analysis module parses the tag data to obtain a set of data corresponding to services and functions for business applications. The interaction control module exchanges service and function information with corresponding target servers, to accomplish appropriate services and/or functions, and to complete the business application.

The disclosed data tagging system also includes a data tag issuing server that is configured to provide, to the user terminal, tag data according to the services as well as service and function information, corresponding to respective target servers.

In the disclosed data tagging system, the data tag issuing server can store a list of application services and corresponding service and function information, and information about target servers associated with the service and function information. The target server information includes API, parameters, and protocol about the associated target server.

In the disclosed data tagging system, the user terminal can be a wired or a wireless terminal, wherein the data tag issuing server is connected to the user terminal through a computer network.

In the disclosed data tagging system, the user terminal further includes a selection control module operated by a user and configured to select some or all in the set of the service and function information.

In the disclosed data tagging system, the user terminal further includes a sequence control module configured to determine the order (i.e. sequential parallel) of the selected service and function information to exchange with target servers.

In the disclosed data tagging method and system, the tag data acquisition module in the user terminal obtains tag data; the tag data analysis module parses the tag data to obtain a set of data corresponding to services and functions for business applications; the interaction control module exchanges service and function information with corresponding target servers, to accomplish appropriate services and/or functions, and to complete the business application. The disclosed data tagging method and system enables the user terminal to directly interact with target servers to accomplish the business application defined by the service and function information, which allows the tasks in complex business applications to be accomplished by distributed servers, and eliminates the need for building application servers in a network system. The disclosed data tagging method and system can thus reduce the cost for application service providers to building dedicated application servers, allow the data tags to be used more broadly, and provide better user experiences and low-cost data tagging methods and system.

These and other aspects, their implementations and other features are described in detail in the drawings, the description and the claims.

DETAILED DESCRIPTION OF THE INVENTION

The disclosed invention can be more clearly understood with the following detailed descriptions of the exemplified embodiments.

Figure 1:
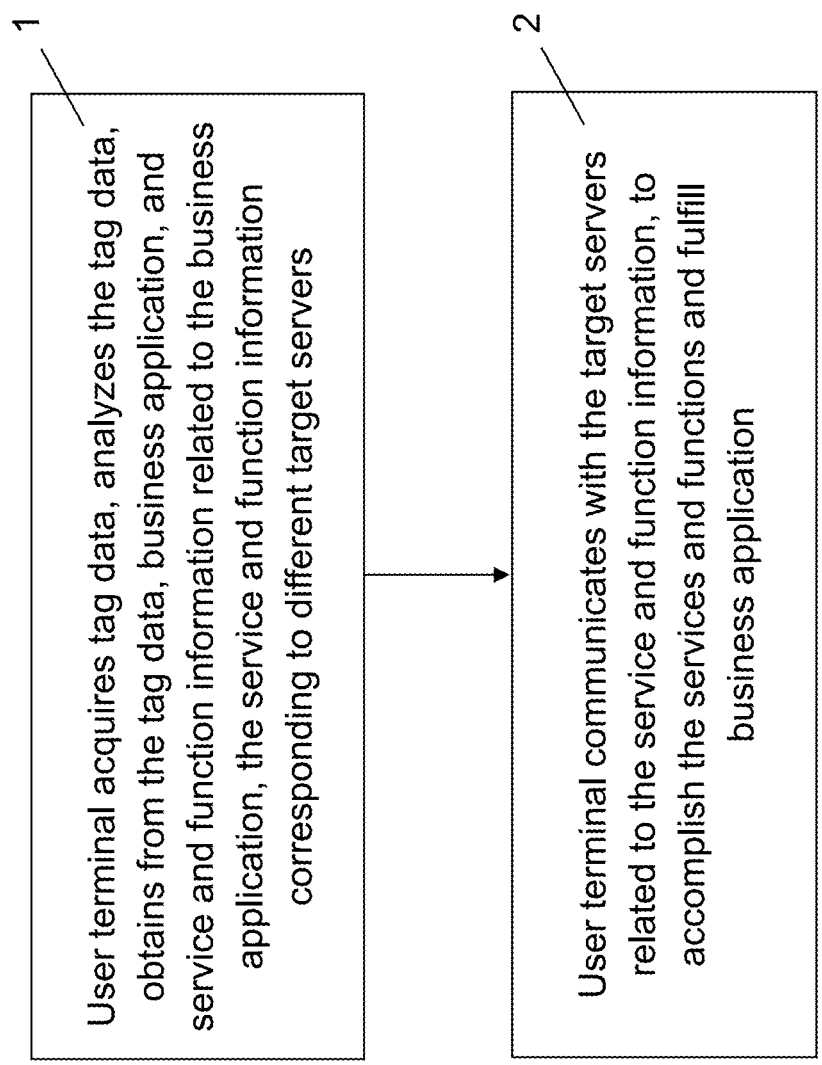
FIG. 1 is a data tagging flow diagram in accordance with some embodiments of the present invention.

A data tagging flow diagram in accordance with disclosed method is shown in FIG. 1.

In some embodiments, referring to FIG. 1, the disclosed data tagging method can include the following steps:

Step 1: the user terminal acquires data from data tag which can be one-dimensional barcode, two-dimensional or three-dimensional code. The data tag can also include a RFID tag, and near field communication (NFC) data. The user terminal parses the data tag to obtain a set of service and function information related to a business application. The service and function information are corresponding to respective target servers. Examples of target servers include data tag issuing server configured to generate data tags that define services, functions, and target servers that implement the services and the functions, analysis server configured to extract service and function information from tag data, selection servers configured to allow user to select a service, location server configured to determine a user's location, authentication server configured to authenticate user's identification, and purchase server configured to process a user's order.

Step 2: the user terminal exchanges the service and function information with the target servers in order to accomplish the services and functions, and fulfill the business application.

Step 1 in the disclosed method can include the following detailed steps:

(11) The user terminal acquires tagging data from a data tag issuing server, parses the tag data, and obtains corresponding business application information in the tag data;

(12) Based on the business application information, the user terminal obtains a set of service and functions information, and information about target servers related to the services and functions. Service information and function information can include product information, location information, logistics, shopping mode selection, and order and payment information.

In some embodiments, the service and function information can include service Software Development Kits (SDK) and function SDKs corresponding to the services or functions. The service SDK and the function SDK respectively include information about their respective target servers, comprising application programming interface (API), parameters, and protocol associated with the target servers.

Step 2 can include one or more of the following detailed steps:

(21) Based user operations, the user terminal selects some or all in the set of the service and function information;

(22) The user terminal interacts with each target server to exchange the selected service and function information, to accomplish appropriate services and functions, and to complete the business application.

In some embodiments, the step of user terminal interacting with each target server to exchange the selected service and function information includes the following steps:

The user terminal determines whether the selected service and function information will be exchanged with the target servers in sequential or in parallel order;

The user terminal exchanges the selected service and function information with the target servers in sequence or in sequential or in parallel order.

Figure 2:
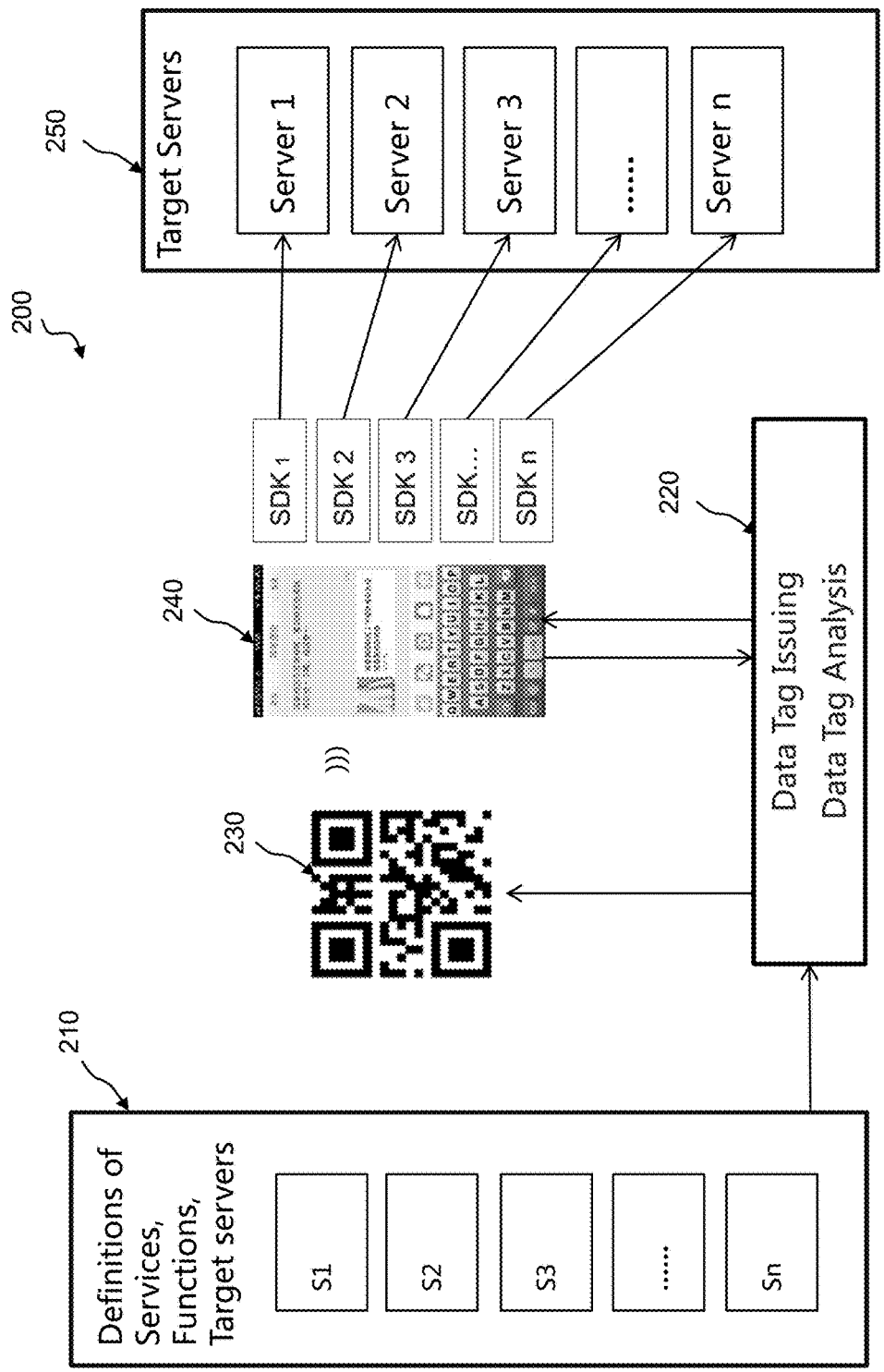
FIG. 2 is a schematic diagram for a system for data tagging in accordance with some embodiments of the present invention.

As shown in the above examples and illustrated in FIG. 2, a data tagging system 200 can include a service definition server 210, a data-tag server 220 for generating and issuing data tag (e.g. 2D code) and for analyzing data obtained from data tag, data tags 230 published on electronic media or printed on paper media, a smart user terminal 240 (e.g. a smart phone) installed with a software application configured to capture an image of the data tag and decode the data tag, which is subsequently analyzed by the data-tag server 220, and one or more target servers 250 that provide services for business applications.

The user terminal 240 can include a smart phone or a tablet computer equipped with a camera, handheld scanner, and RFID sensing device. The user terminal 240 can include a tag data acquisition module, a tag data analysis module, and an interaction control module. The tag data acquisition module is configured to acquire data from data tags and store the data. The tag data analysis module parses the tag data to obtain a set of data corresponding to services and functions for a business application. The interaction control module exchanges service and function information with corresponding target servers 250, to accomplish appropriate services and/or functions, and to complete the business application.

The data-tag server 220 is configured to provide, to the user terminal 240, tag data according to the services as well as service and function information, corresponding to respective target servers 250. In some embodiments, at least part of data tag decoding tasks is conducted by the data-tag server 220. The user terminal 240 can be a wired or a wireless terminal, wherein the data-tag server 220 communicates with the user terminal 240 through a computer network.

In the disclosed data tagging system, the data-tag server 220 that issues data tag can store a list of application services and corresponding service and function information, and information about target servers 250 associated with the service and function information. The target server information includes API, parameters, and protocol about the associated target servers 250.

Still referring to FIG. 2, service information and function information can include product information, location information, logistics information, shopping mode selection, order and payment information. In some embodiments, the service and function information include SDK 1, SDK 2 . . . , SDK n, which can include service Software SDKs and function SDKs corresponding to the services or functions. The service SDK and the function SDK respectively specify information about their respective target servers 250, such as application programming interface (API), parameters, and protocol associated with the target servers 250.

In some embodiments, the user terminal 240 further includes a selection control module operated by a user and configured to select some or all in the set of the service and function information.

In some embodiments, the user terminal 240 further includes a sequence control module configured to determine the order (i.e. sequential parallel) of the selected service and function information to exchange with target servers.

By realizing OTO service definitions, integration, and collaboration, the disclosed system and methods transformed how services are organized and provided, can achieve real-time services by collaboration across organizations, and enable flexible combination of services, refinement of service units, and automated service coordination.

The above discussed data tagging methods and system are further illustrated by following examples:

Example 1

Product Ordering in Response to Tag Data

During store shopping, a consumer can use a mobile phone to take picture of data tag such as a 2D code on a commodity. An application (i.e. APP) installed on the mobile phone can decode the 2D code in the captured image and obtain application service embedded in the 2D code to order the commodity. The consumer can also obtain service information and function information such as product information, location information, logistics information, shopping mode selection, and order and payment information.

Specifically, the mobile phone first uses the application to connect to the server that maintains the product information via a mobile wireless network, acquires the product information, and displays it on the mobile phone. Then a location server (an example of a target server) determines the location of the consumer, and his or her relative location to the manufacturer and the storage warehouse. Web-based product order information is provided to the consumer. A purchase-method selection server (another example of a target server) integrates product and logistic information, and provides the consumer different purchase prices for different purchase methods. After the consumer confirms a purchase method, an order server (another example of a target server) transmits the order to the store for ordering from existing stock. Alternatively, the order server can send to order directly to the manufacturer and a logistics vendor through a computer network. Finally, the consumer can complete product purchase by making payment using his or her mobile phone. It should be noted that such 2D codes can also be printed directly in advertisements on newspapers and magazines. Consumers can process the product purchase by capture the image of the 2D codes on newspapers or magazines.

Thus, the generation of a 2D code for product ordering only requires that the service and function information and information about corresponding target servers to be contained in the corresponding SDKs. The user terminal can decode the 2D code and communicate with target servers directly to fulfill orders. Thus, the tasks of an order server are decomposed, which refines the 2D code application, providing more flexible services and functions, at lower cost.

Example 2

TV Set-Top Boxes

With the increased popularity of high-definition television, TV set-top boxes become common household electronic devices and in hotels. HD programs typically require users to pay a fee. However, the right to watch HD programs is tied to a specific TV set-top box. It is difficult for a user to watch the HD programs on a different TV set-top box. Moreover, another difficulty is to allow users to watch HD TV programs for a short term in hotels and other venues.

The data tagging method and system enable a data tag such as a 2D code to be displayed on TV after the TV set-top box is turned on. A user can take a picture of the 2D code using a mobile phone. The mobile phone can decode the 2D code, extract service information for the paid TV programs, and can obtain information about authentication, permissions, payment information, and other services and features.

First, the 2D code includes information about an authentication server (another example of a target server). The user can authenticate his or her identification through authentication server, and then register or login via an authorization server. If the user has purchased the pay-TV service, the authorization server sends to right-to-use confirmation, via a computer network, to the specific TV set-top box that the user is using, which allows the user to TV programs on the specific TV connected to the TV set-top box. Thus, the right to watch pay-TV is no longer tied to a specific TV set-top box. A consumer can watch pay-TV programs on any set-top box. If the user has not purchased a pay-TV service, the user can pay for the pay-TV service using the purchase information extracted from the 2D code on his or her mobile phone. The mobile phone can communicate directly with a purchase server (another example of a target server) to complete the order. The simplified pay-TV process is very suitable for short-term user of pay-TV services, in hotels etc.

Moreover, suitable data tags can include printed data codes (1D, 2D, 3D codes) and RFID tags. Examples of 2D codes include, but not limited to, two-dimensional barcodes, data matrix codes, or QR codes, etc. The 2D codes are first captured the smart user terminal and decoded by the software application on the smart user terminal to obtain tag data. The tag data is then parsed and analyzed by the analysis server to extract service and function information from the tag data. The software application (e.g. the mobile application on the smart phone) receives the service and function information and displays them on the smart terminal, as shown in FIG. 2. On the other hand, RFID tags can store service and function. Once retrieved, the mobile application can display such information at the user terminal without involving an analysis server.

The disclosed method and system include the following features:

1. Unified encoding rules for tag data. A data tag issuing server generates data tags according to services and functions to be provided and received, wherein the data tags can be retrieved by applications on intelligent user terminals.

2. Tag data retrieved by the intelligent terminals are defined by a combination of the data tag issuing server and intelligent user terminals, target servers that provide services, and collaborative approach to provide services.

3. An analysis server parses the tag data retrieved by the intelligent terminal to obtain SDKs related to target servers and services, and provides the SDKs the intelligent terminal.

4. The tag data is configured to provide and/or receive all services and functions necessary for a business application. A user can choose a service or function through a software application (e.g. a mobile App) at an intelligent terminal to interact with target servers, to accomplish actions and service contracts by coordinating services and the corresponding target servers.

The disclosed method and system can include one or more of the following advantages:

1. Flexible combination of services. Services can be flexibly combined and coordinated in response to data tag scanning by a user and user defined services. Tag data include SDKs that define relationship between different target servers based on services, target servers, and service contracts. The disclosed methods also assure coordination among services and in-depth specialization and optimization of resources.

2. More user friendly experiences. The disclosed tag data improve friendliness and user operability of the user interface. A user can select appropriate services at a user interface according to the specific combination of services that is desirable to the user.

3. In-depth utilization of a portfolio of services allows separation of authentication, payment, and service fulfillment, which increases the system security.

In the disclosed data tagging methods and system, a user terminal obtains data from data tag using a tag data acquisition module, parses the tag data using a tag data analysis module to acquire corresponding business applications and associated service and function information. An interaction control module in the user terminal then interactively communicates with target servers to exchange service and function information to fulfill business application. In the disclosed data tagging methods and system, the user terminal can implement business application based on the tag data, and directly accomplish services and functions by interacting with target servers that provide such services and functions, which eliminates the need for a central application server to fulfill the services. Different in complex business applications can therefore by accomplished by distributed interactive target servers, which effectively simplifies operation of utilizing tag data, reduces the costs of building application servers by service providers. The disclosed data tagging methods and system are more convenient and of lower cost, which allow wider applications data tagging, with improved user experiences.

In the present specification, the present invention has been described with specific examples. However, it should be noted that various modifications and variations may be made without departing from the spirit and scope of the invention. Accordingly, the specification and drawings are to be regarded for illustrative rather than restrictive purposes.

What is claimed is:

1. A computer-implemented method for providing services using data tags, comprising:
    acquiring an image of a data tag by a user terminal in communication with a data-tag server;
    obtaining service and function information related to an application service from the data tag by the data-tag server, wherein the service and function information defines tasks required to fulfill the application service as well as target servers to conduct the respective tasks;
    enabling the user terminal to directly communicate with a group of distributed target servers about the application service, wherein the group of distributed target servers includes at least one of a location server, a purchase-method selection server, or an order server; and
    enabling the group of distributed target servers to conduct the tasks defined in the service and function information to fulfill the application service, comprising:
        determining a location of the user terminal;
        allowing the user terminal to select a purchase method by the purchase-method selection server;
        providing different pricing information from the purchase-method selection server to the user terminal based on the selected purchase method; and
        processing an order submitted from the user terminal by the order server, wherein the order is fulfilled based in part on the location of the user terminal.

2. The computer-implemented method of claim 1, wherein the data tag comprises a one-dimensional code, a two-dimensional code, a two-dimensional barcode, a data matrix code, a QR code, or a three-dimensional code.

3. The computer-implemented method of claim 1, wherein the step of obtaining comprises decoding the data tag to obtain the service and function information related to application services.

4. The computer-implemented method of claim 1, wherein at least a portion of the decoding step is conducted by the data-tag server.

5. The computer-implemented method of claim 1, wherein the data-tag server is configured to generate the data tag that encodes the service and function information to specify the application service.

6. The computer-implemented method of claim 1, wherein the user terminal receives the service and function information and information about the group of target servers from the data-tag server.

7. The computer-implemented method of claim 6, wherein the information about the group of target servers comprises application programming interface (API), parameters, and protocol associated with the group of target servers.

8. The computer-implemented method of claim 7, wherein the information about the group of target servers is defined in a Software Development Kit.

9. The computer-implemented method of claim 1, further comprising:
    allowing the user terminal to select at least a portion of the service and function information, wherein the group of distributed target servers conducts the tasks based on the selected portion of the service and function information.

10. The computer-implemented method of claim 1, further comprising:
    allowing the user terminal to select to communicate with the group of distributed target servers in sequential order or parallel order, wherein the user terminal directly communicates with the group of distributed target servers in the selected sequential order or the selected parallel order.

11. The computer-implemented method of claim 1, wherein the group of target servers comprises an authentication server, a permission server, or a payment server, the method further comprising:
    allowing the data tag to be displayed on a television device controlled by a TV set-top box;

authenticating an identification associated the TV set-top box by the authentication server; and based on the step of authentication, permitting a TV service to be provided to the TV set-top box by the permission server.

12. The computer-implemented method of claim 11, further comprising:

receiving payment from the user terminal by the payment server, wherein the TV service is permitted to be provided to the TV set-top box by the permission server after the payment is received.

13. The computer-implemented method of claim 1, wherein the user terminal includes a mobile phone or a tablet computer.

14. A computer system for providing services using data tags, comprising:

a data-tag server in communication with a user terminal, wherein the user terminal is configured to acquire an image of a data tag, wherein the data-tag server is configured to obtain service and function information related to an application service from the data tag, wherein the service and function information defines tasks required to fulfill the application service as well as target servers to conduct the respective tasks; and a group of distributed target servers which the user terminal is configured to directly communicated with about the application service, wherein the group of distributed target servers includes at least one of a location server, a purchase-method selection server, or an order server, wherein the location server is configured to determine a location of the user terminal, wherein the purchase-method selection server is configured to allow the user terminal to select a purchase method by the purchase-method selection server and to provide different pricing information from the purchase-method selection server to the user terminal based on the selected purchase method, wherein the order server is configured to process an order submitted from the user terminal, wherein the order is fulfilled based in part on the location of the user terminal, wherein the group of distributed target servers are configured to conduct the tasks defined in the service and function information to fulfill the application service.

15. The computer system of claim 14, wherein the data tag comprises a one-dimensional code, a two-dimensional code, a two-dimensional barcode, a data matrix code, a QR code, or a three-dimensional code.

16. The computer system of claim 14, wherein the data-tag server is configured to generate the data tag that encodes the service and function information to specify the application service.

17. The computer system of claim 14, wherein the data-tag server is configured to send the service and function information and information about the group of target servers to the user terminal, wherein the information about the group of target servers comprises application programming interface (API), parameters, and protocol associated with the group of target servers.

18. The computer system of claim 14, wherein the group of target servers comprises an authentication server, a permission server, or a payment server, wherein the data tag is displayed on a television device controlled by a TV set-top box, wherein the authentication server is configured to authenticate an identification associated the TV set-top box, wherein the permission server is configured to permit a TV service to be provided to the TV set-top box based on the authentication, wherein the payment server is configured to receive payment from the user terminal, wherein the TV service is permitted to be provided to the TV set-top box by the permission server after the payment is received.

19. A computer apparatus for providing services using data tags, comprising:

a tag data acquisition module configured to acquire an image of a data tag by a user terminal in communication with a data-tag server;

a tag data parsing module configured to parse data tag, wherein service and function information related to an application service is obtained from the data tag by the data-tag server, wherein the service and function information defines tasks required to fulfill the application service as well as target servers to conduct the respective tasks; and an interaction control module to directly communicate with a group of distributed target servers about the application service, which enables the group of distributed target servers to conduct the tasks defined in the service and function information to fulfill the application service, wherein the group of target servers comprises an authentication server, a permission server, a purchase-method selection server, or a payment server, wherein the data tag is displayed on a television device controlled by a TV set-top box, wherein the authentication server is configured to authenticate an identification associated the TV set-top box, wherein the permission server is configured to permit a TV service to be provided to the TV set-top box based on the authentication, wherein the user terminal is configured to send a payment to the payment server, wherein the purchase-method selection server is configured to send different pricing information to the user terminal or the TV set-top box on which a purchase method is selected, and wherein the TV service is permitted to be provided to the TV set-top box by the permission server after the payment is received.

20. The computer apparatus of claim 19, further comprising:

a selection control module configured to select at least a portion of the service and function information, wherein the group of distributed target servers conducts the tasks based on the selected portion of the service and function information.

21. The computer apparatus of claim 19, further comprising:

a sequence control module configured to select whether to directly communicate with the group of distributed target servers in sequential order or parallel order, wherein the user terminal directly communicates with the group of distributed target servers in the selected sequential order or the selected parallel order.

22. The computer apparatus of claim 19, wherein the interaction control module is configured to receive the service and function information and information about the group of target servers from the data-tag server, wherein the information about the group of target servers comprises application programming interface (API), parameters, and protocol associated with the group of target servers.

23. The computer apparatus of claim 19, wherein the group of distributed target servers includes at least one of a location server, a purchase-method selection server, or an order server, wherein the location server is configured to determine a location of the user terminal, wherein the purchase-method selection server is configured to allow the user terminal to select a purchase method by the purchase-method selection server and to provide different pricing information from the purchase-method selection server to the user terminal based on the selected purchase method, wherein the order server is configured to process an order submitted from the user terminal, wherein the order is fulfilled based in part on the location of the user terminal.

* * * * *